(12) United States Patent
Kinoshita et al.

(10) Patent No.: US 12,237,122 B2
(45) Date of Patent: Feb. 25, 2025

(54) ELECTRONIC APPARATUS

(71) Applicant: Lenovo (Singapore) Pte. Ltd., Singapore (SG)

(72) Inventors: Hiroaki Kinoshita, Kanagawa (JP); Kazuya Tatsuno, Kanagawa (JP); Tetsuya Sano, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 185 days.

(21) Appl. No.: 18/158,475

(22) Filed: Jan. 24, 2023

(65) Prior Publication Data
US 2023/0268143 A1 Aug. 24, 2023

(30) Foreign Application Priority Data
Feb. 18, 2022 (JP) ................ 2022-023584

(51) Int. Cl.
*H01H 13/14* (2006.01)
*G06F 1/16* (2006.01)
*H01H 13/20* (2006.01)
*H01H 13/70* (2006.01)

(52) U.S. Cl.
CPC ........... *H01H 13/14* (2013.01); *G06F 1/1662* (2013.01); *H01H 13/20* (2013.01); *H01H 13/70* (2013.01)

(58) Field of Classification Search
CPC ......... G06F 1/16; G06F 1/1662; H01H 13/14; H01H 13/20; H01H 13/70; H01H 13/00; H01H 13/04; H01H 13/83; H01H 13/50; H01H 13/52; H01H 13/705; H01H 3/00; H01H 3/02; H01H 3/12; H01H 9/02; H01H 9/0214; H01H 9/0242; H01H 2003/02; H01H 2003/12; H01H 2013/00; H01H 2013/02; H01H 2013/50; H01H 2013/52; H01H 2221/00; H01H 2223/01; H01H 2223/034; H01H 2223/04
USPC ........................................ 200/345
See application file for complete search history.

(56) References Cited

U.S. PATENT DOCUMENTS 6,148,183 A * 11/2000 Higdon ................ H01H 13/807
455/575.1
2010/0232122 A1* 9/2010 Chen ..................... H04M 1/236
361/752

FOREIGN PATENT DOCUMENTS

JP 2003-044174 A 2/2003
JP 2009-170176 A 7/2009

* cited by examiner

*Primary Examiner* — Anthony R Jimenez
(74) *Attorney, Agent, or Firm* — Osha Bergman Watanabe & Burton LLP

(57) ABSTRACT

The electronic apparatus has: a flat-shaped main body chassis provided with a motherboard; a switch provided at an end portion of the motherboard; a button for pressing an actuator of the switch; a restriction section that restricts the button from rotating around a contact portion when the button presses the actuator; and a button opening formed in a side wall of the main body chassis at a position shifted to a higher level than the switch. The button includes: an operation section exposed through the button opening; an arm portion that extends to a position facing the actuator; and a fin piece that protrudes. The restriction section is provided in such a manner as to face the fin piece at a position vertically shifted to a lower level then the fin piece.

11 Claims, 6 Drawing Sheets

ELECTRONIC APPARATUS

CROSS-REFERENCE TO RELATED APPLICATIONS

This application claims priority to Japanese Patent Application No. 2022-23584 filed on Feb. 18, 2022, the contents of which are hereby incorporated herein by reference in their entirety.

BACKGROUND OF THE INVENTION

Field of the Invention

The present invention relates to an electronic apparatus provided with a button.

Description of the Related Art

In an electronic apparatus such as a laptop PC, a main body chassis having an electronic board and a keyboard mounted therein and a display chassis having a display mounted therein are connected by hinges as shown in, for example, Japanese Unexamined Patent Application Publication No. 2009-170176. A button switch for power or the like of the electronic apparatus is frequently provided on the upper surface of the main body chassis as described in Japanese Unexamined Patent Application Publication No. 2009-170176.

SUMMARY OF THE INVENTION

Because of a demand for making laptop PCs compact, button switches are placed on the side surfaces of main body chassis in some cases so as to reduce the plan view areas of the main body chassis. A button switch can be composed of a switch mounted on an electronic board, and a button that presses an actuator of the switch by pressing an operation section exposed on a side surface of a main body chassis.

Meanwhile, due to another demand for making laptop PCs thinner, there are cases where it is difficult to coaxially place a switch and a button because of a limited internal space. For this reason, the button is provided with an arm portion that extends to a position where the arm portion faces an actuator, and the actuator is pressed through the arm portion. However, in such a configuration, when the button is pressed, the button inconveniently rotates around the portion of contact with the actuator, thus deteriorating the operability of the button.

One or more embodiments of the present invention provide an electronic apparatus capable of achieving high operability of a button.

In order to solve the above-described problem and to achieve the object, an electronic apparatus according to one or more embodiments of the present invention is an electronic apparatus having a flat-shaped chassis provided with an electronic board, the electronic apparatus including: a switch provided at an end portion of the electronic board such that an actuator protrudes toward a side of the chassis; a button for pressing the actuator; a restriction section that restricts the button from rotating around a portion of contact with the actuator at the time of pressing the actuator; and a button opening formed in a side surface of the chassis at a position shifted to one side from the switch with respect to a thickness direction of the chassis, wherein the button includes: an operation section partly exposed through the button opening; an arm portion that extends to a position where the arm portion faces the actuator; and a fin piece that protrudes in a direction of displacement at the time of a pressing operation, and the restriction section is provided in such a manner as to face the fin piece at a position shifted to the other side from the fin piece with respect to the thickness direction of the chassis.

The restriction section may be formed of an end portion of the electronic board.

The button may have an elastic piece protruding from each end of the operation section in a direction orthogonal to the fin piece, and the elastic piece may be provided at a position shifted to the one side from a center of the operation section with respect to the thickness direction of the chassis.

A pair of the fin piece and the restriction section may be provided on each side of the switch.

The fin piece may be shaped such that a distance from the restriction section increases toward a tip thereof.

The one surface of the chassis may be provided with a keyboard, and the button opening may be provided in a side of the keyboard.

The fin piece may be at a position laterally shifted from an end portion of the keyboard when the button is inactive.

The switch may be mounted on the other surface of the electronic board.

According to the above-described aspects of the present invention, the switch and the operation section of the button are not coaxial, so that a rotational moment acts around the contact portion between the arm portion and the actuator when the operation section is pressed. However, the button is provided with the protruding fin pieces, and the restriction sections are provided at the positions where the restriction sections oppose the fin pieces, so that the fin pieces come in contact with the restriction sections thereby to restrict an excessive rotation of the button even when the button rotates, thus making it possible to achieve high operability.

DETAILED DESCRIPTION OF THE INVENTION

The following will describe in detail embodiments of an electronic apparatus according to the present invention with reference to the accompanying drawings. It should be noted that the present invention is not limited by the embodiments.

Figure 1:
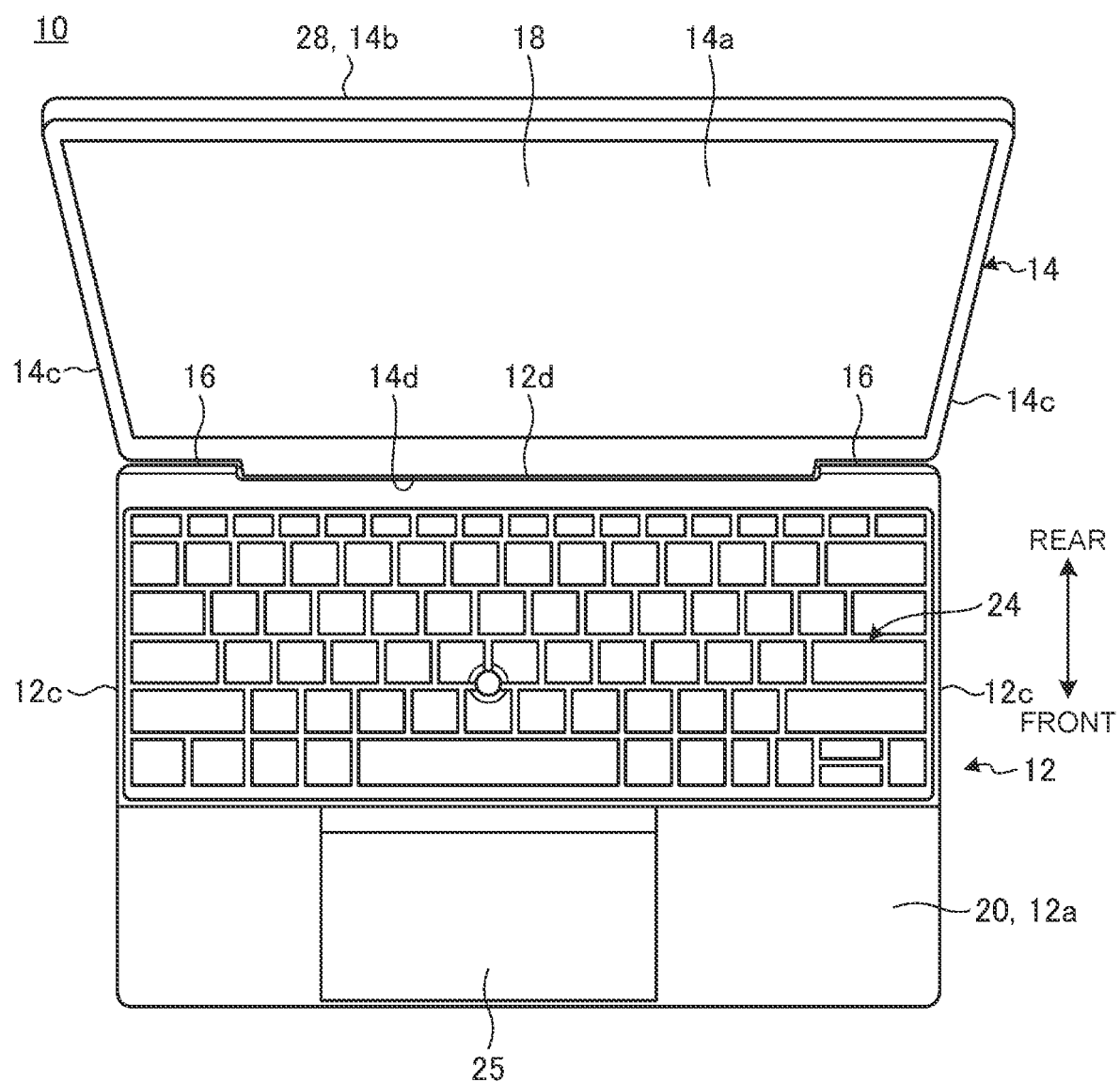
FIG. 1 is a schematic plan view of an electronic apparatus according to one or more embodiments of the present invention viewed from above.

FIG. 1 is a schematic plan view of an electronic apparatus 10 according to embodiments of the present invention observed from above. As illustrated in FIG. 1, the electronic apparatus 10 is a clamshell laptop PC in which a main body chassis 12 and a display chassis 14 are connected by hinges 16 in a relatively rotatable manner. The electronic apparatus according to the present invention may be a foldable PC, a tablet PC, a smartphone, or the like other than a laptop PC.

The main body chassis 12 is a flat box body. Regarding the main body chassis 12, the side visible in FIG. 1 and on which the keyboard 24 is provided is defined as "top" (one side with respect to the thickness direction), and the side opposite therefrom is defined as "bottom" (the other side with respect to the thickness direction). Further, the lower side in the figure of FIG. 1 is defined as "front" and the side opposite therefrom and closer to the hinges 16 is defined as "rear."

Figure 5:
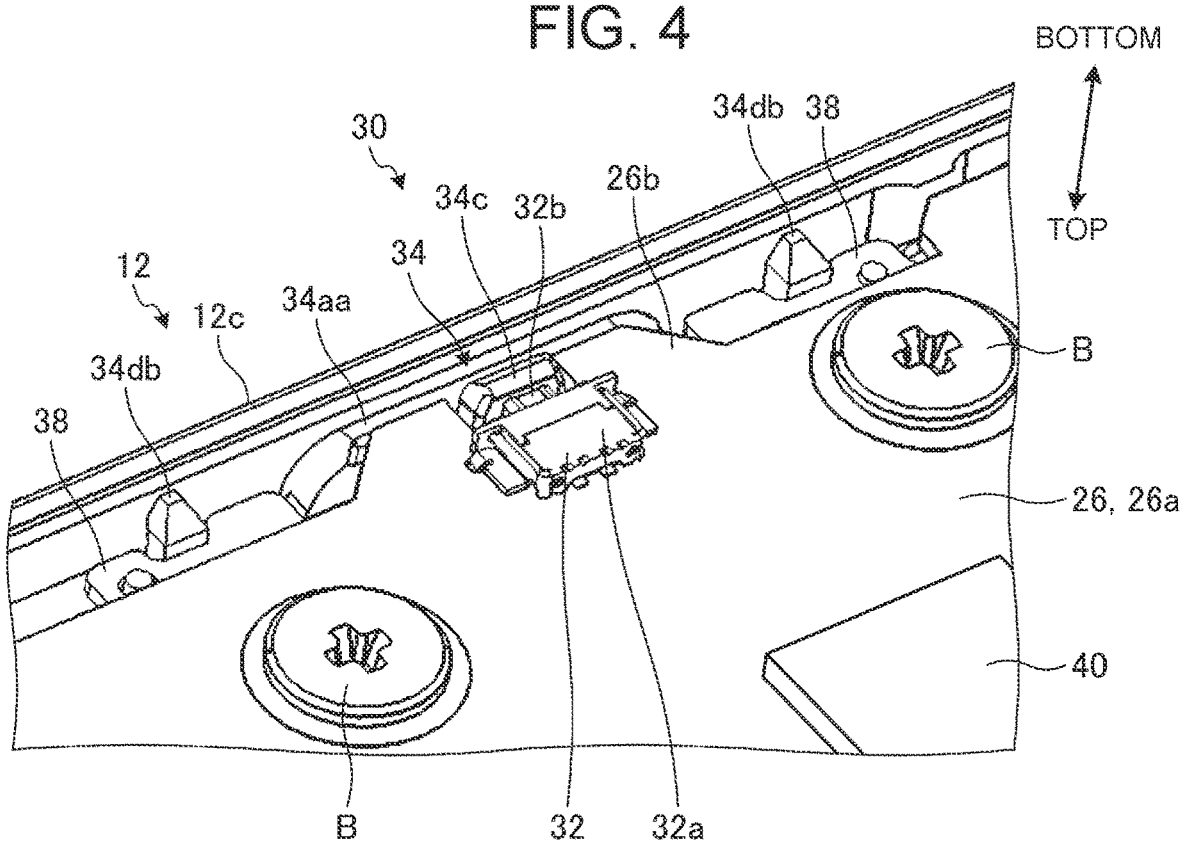
FIG. 5 is a partial enlarged perspective view of the main body chassis with a lower cover member removed.
Figure 6:
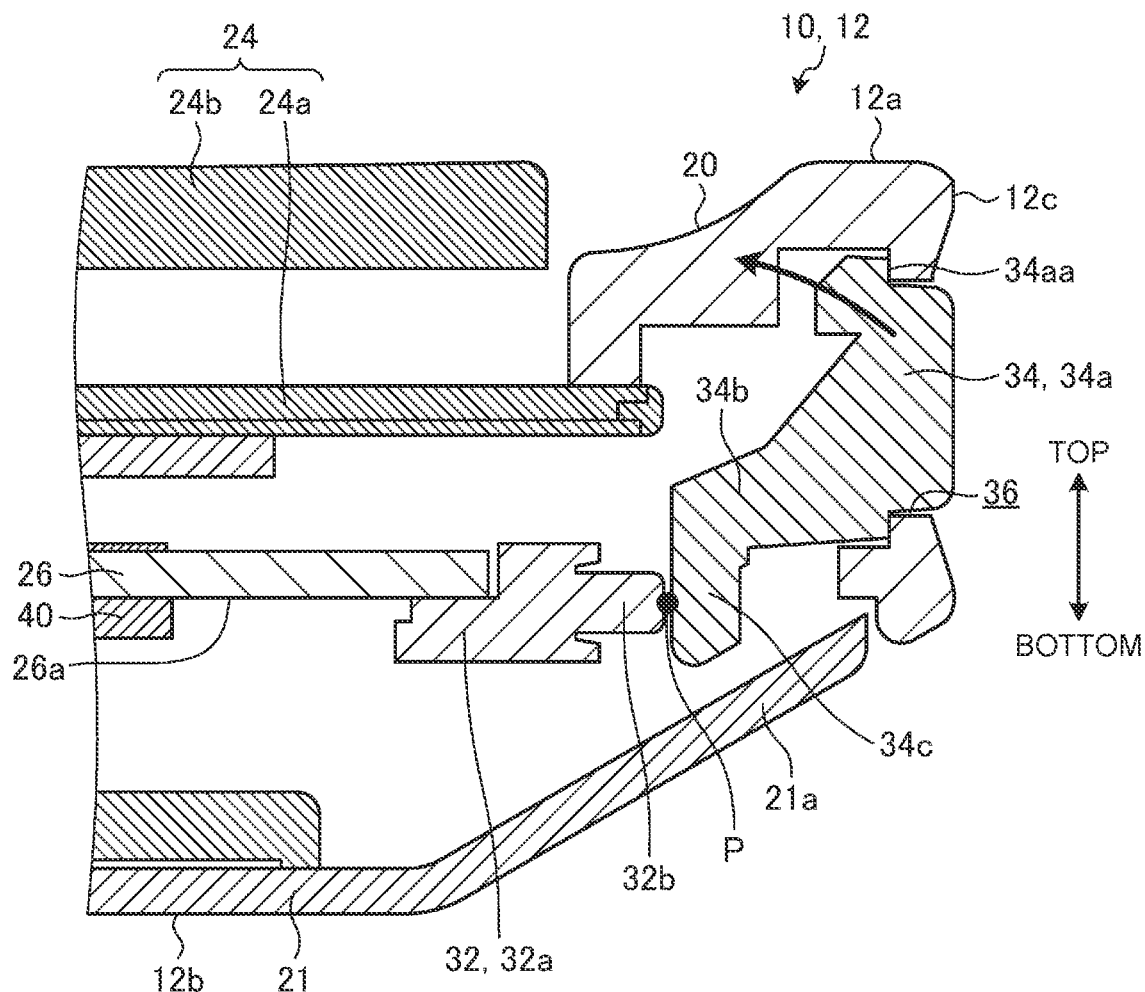
FIG. 6 is a sectional front view of a place including a switch in the main body chassis.

The main body chassis 12 has an upper cover member 20 forming an upper surface 12a, and a lower cover member 21 forming a lower surface 12b (refer to FIG. 6). Front, rear, left, and right side walls 12c of the main body chassis 12 are formed of wall portions rising from the four peripheral edge portions of the upper cover member 20. A keyboard 24 and a touch pad 25 are provided on the upper surface 12a. The keyboard 24 is provided over substantially the entire width of the main body chassis 12 in a left-right direction. In other words, the upper cover member 20 has substantially the same width as the keyboard 24 so as to configure the main body chassis 12 to be compact. The main body chassis 12 accommodates therein various electronic components such as a motherboard 26 (refer to FIG. 5), which is an electronic board, a battery device, an SSD (Solid State Drive), a memory, and an antenna device.

The display chassis 14 is a thin, flat box body. A display 18 is provided on a front surface 14a of the display chassis 14. The display chassis 14 has a rear cover member 28 that forms a rear surface 14b. The front, rear, left and right side surfaces 14c of the display chassis 14 are formed of the wall portions rising from the four peripheral edge portions of the rear cover member 28. The side surfaces 14c may be composed of a member that is independent from the rear cover member 28. The display 18 is composed of, for example, organic EL (OLED: Organic Light Emitting Diode) or liquid crystal. The display 18 may be a touch panel type. The display chassis 14 has the hinges 16 installed to a lower surface 14d in FIG. 1. The hinges 16 connect opposing side surfaces 12d and 14d of the chassis 12 and 14, respectively. The hinges 16 of one or more embodiments are provided in a pair on the left and right, but may alternatively be a single long structure.

Figure 2:
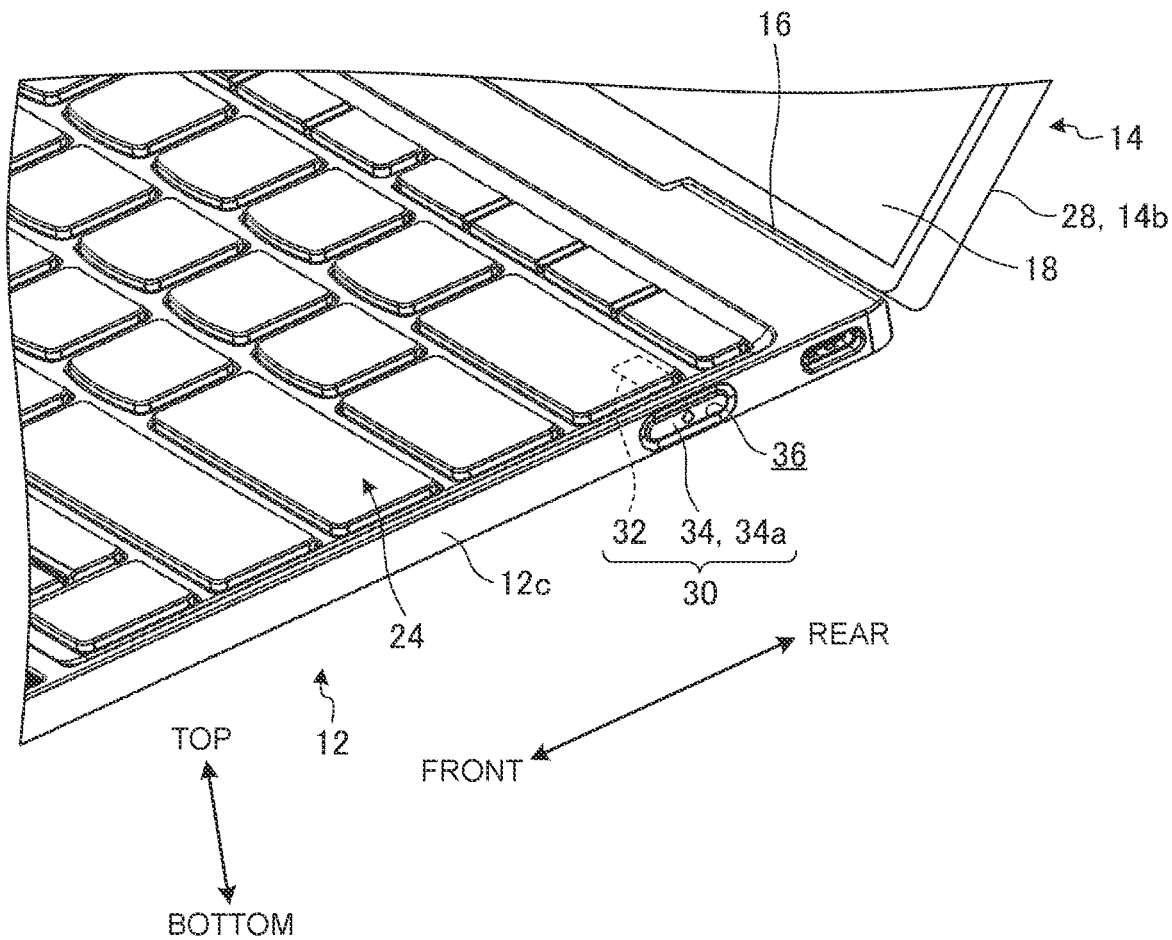
FIG. 2 is an enlarged perspective view of a side portion of the electronic apparatus.

FIG. 2 is an enlarged perspective view of a side portion of the electronic apparatus 10. The power of the electronic apparatus 10 is turned on by operating a button switch 30. The power of the electronic apparatus 10 is turned off automatically by software or by pressing and holding the button switch 30. The button switch 30 has a switch 32, which is provided in an end portion of the motherboard 26 (refer to FIG. 5), and a button 34. A long oval-shaped button opening 36 is formed in the side wall 12c on the right side of the keyboard 24 of the main body chassis 12. The side wall 12c is formed thin, and the button opening 36 is provided over substantially the entire width of the side wall 12c in the thickness direction. The button opening 36 is provided at a position relatively close to the hinge 16 and near the rear side in the side wall 12c. A part of an operation section 34a of the button 34 is exposed through the button opening 36.

Figure 3:
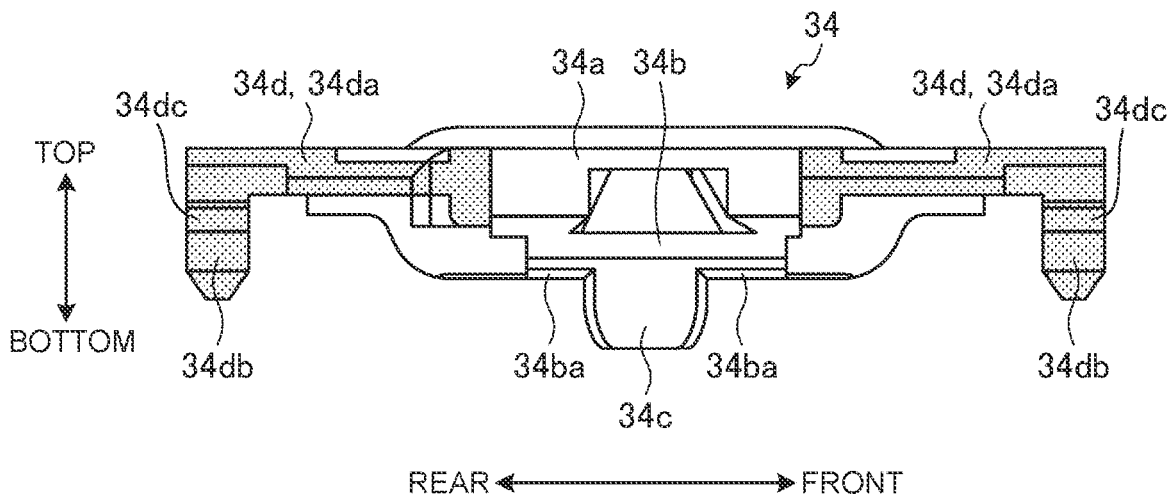
FIG. 3 is a side view of a button viewed from the inside of a main body chassis.
Figure 4:
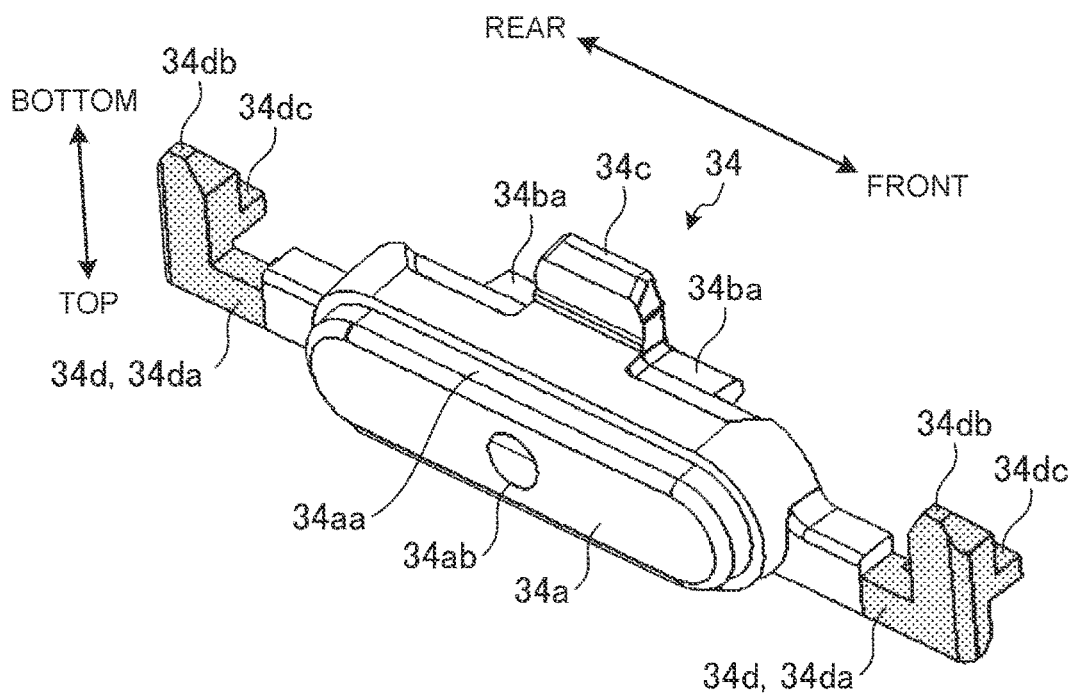
FIG. 4 is a perspective view of the button viewed from below.

FIG. 3 is a side view of the button 34 viewed from the inside of the main body chassis 12. FIG. 4 is a perspective view of the button 34 viewed from below. The button 34 has the above-described operation section 34a serving as a base body, and includes a protrusion piece 34b protruding toward the inner side of the main body chassis 12 from the lower end of the operation section 34a, an arm portion 34c extending downward from the tip of the protrusion piece 34b, and elastic pieces 34d protruding from both ends of the operation section 34a. The protruding direction of the elastic pieces 34d is the front-rear direction, i.e., the direction orthogonal to the protruding direction of the protrusion piece 34b, and the elastic pieces 34d protrude such that the long oval-shaped operation section 34a extends in the longitudinal direction.

The length of the arm portion 34c in the front-rear direction is approximately ⅓ that of the protrusion piece 34b, and is provided at the center of the protrusion piece 34b. The arm portion 34c has a planar surface facing the inside of the main body chassis 12. This planar portion presses an actuator 32b, which will be described later. In the protrusion piece 34b, portions on both front and rear sides sandwiching the arm portion 34c form fin pieces 34ba. The fin pieces 34ba are thinned in such a manner as to form an acute angle toward the tips (refer also to FIG. 7). The operation section 34a has a step 34aa formed at the boundary between portion exposed outside and a portion housed inside the chassis. In the operation section 34a, a circular mark 34ab is provided at the center of the portion exposed outside.

In the button 34, the elastic pieces 34d are made of an elastic material such as rubber, and the rest thereof is made of a resin material. The elastic pieces 34d are molded integrally with the rest thereof. In FIG. 3 and FIG. 4, the elastic pieces 34d are indicated using dots for easy identification. Each of the elastic pieces 34d has an extension portion 34da extending from the operation section 34a, a bent portion 34db bent downward at the tip thereof, and an engagement projection 34dc provided in the middle of the bent portion 34db. The extension portions 34da have moderate lengths, and the total length of the pair of the extension portions 34da is approximately the same as the length of the operation section 34a. The extension portions 34da are provided at a position shifted upward from the center of the operation section 34a in the vertical direction (the thickness direction of the chassis). The tips of the bent portions 34db are tapered. The engagement projections 34dc protrude in the same direction as the protrusion piece 34b.

FIG. 5 is a partial enlarged perspective view of the main body chassis 12 with the lower cover member 21 removed. The switch 32 is mounted on an end portion of a lower surface 26a of the motherboard 26. The lower surface 26a has a plurality of chips 40 mounted thereon other than the switch 32, and is configured to be conveniently exposed for maintenance or the like in a state in which the lower cover member 21 has been removed. The switch 32 is mounted on the same surface as the other chips 40 and can be therefore mounted in the same process.

The switch 32 is a so-called microswitch, and has a main body 32a incorporating a contact, and an actuator 32b protruding from the main body 32a. The actuator 32b protrudes toward the side wall 12c of the main body chassis 12. Restriction pieces (restriction portions) 26b protruding close to the inner surface of the side wall 12c are formed on both sides of the switch 32 of the motherboard 26 in such a manner as to sandwich the switch 32. The restriction pieces 26b are formed of the protruding end portions of the motherboard 26. The pair of the restriction pieces 26b have a symmetrical shape with both sides inclined and have a moderate width. The actuator 32b is placed between the pair of the restriction pieces 26b.

The step 34aa of the button 34 is in contact with the inner surface of the side wall 12c, and a side surface of the operation section 34a is exposed to the outside through the button opening 36 (refer to FIG. 2). The pair of the bent portions 34db are fixed in contact with the inner surface of the side wall 12c while being held by metal fittings 38. The engagement projections 34dc are engaged in contact with the upper surfaces (not illustrated) of the metal fittings 38. The arm portion 34c is located between the pair of the restriction pieces 26b, and extends to the position where the arm portion 34c faces the actuator 32b.

When the operation section 34a of the button 34 is manually pressed, the operation section 34a is slightly displaced inward against the elastic force of the elastic pieces 34d. The arm portion 34c is displaced together with the operation section 34a, thus pressing the actuator 32b located at the opposing position thereby to turn the switch 32 on. When the manual pressing is released, the operation section 34a and the arm portion 34c return to the original positions thereof by the elastic action of the elastic pieces 34d, thus turning the switch 32 off. The motherboard 26 is fixed to the upper cover member 20 or other member by two screws B in the vicinity of the switch 32, and the switch 32 remains stable when pressed by the button 34. The metal fittings 38 are fastened together by the screws B.

FIG. 6 is a sectional front view of a place including the switch 32 in the main body chassis 12. The keyboard 24 is configured to have a support plate 24a as a base, and has a structure in which a plurality of key tops 24b are exposed on the upper surface thereof. The end of the support plate 24a reaches very close to the side wall 12c, making it difficult to place the switch 32 between the support plate 24a and the side wall 12c due to layout considerations. Further, the motherboard 26 and the support plate 24a are placed vertically in parallel so as to face each other, and the switch 32 mounted on the motherboard 26 is placed at a lower level than the support plate 24a. Further, the switch 32 is mounted, together with the other chips 40, on the lower surface 26a of the motherboard 26, so that the switch 32 is placed at a considerably lower level than the support plate 24a.

The end portion of the lower cover member 21 has an inclined surface 21a formed to be directed upward toward the side. This makes the side wall 12c narrower, thus providing an ideal appearance for exhibiting a thinner profile. The button opening 36 formed in the side wall 12c is placed beside the support plate 24a at approximately the same height and is positioned vertically shifted to a higher level than the switch 32.

Figure 7:
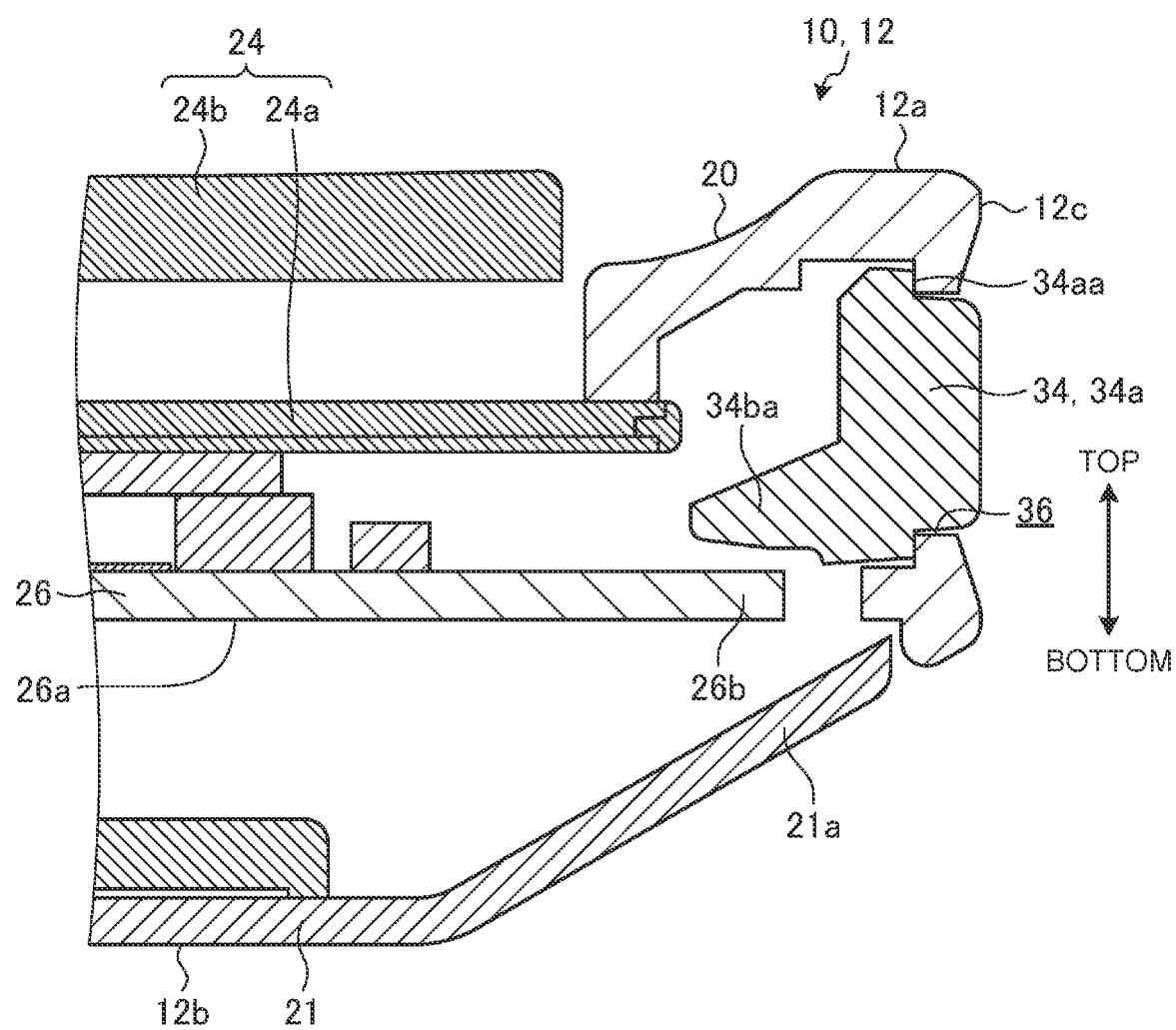
FIG. 7 is a sectional front view of a place including a restriction piece in the main body chassis.
Figure 8:
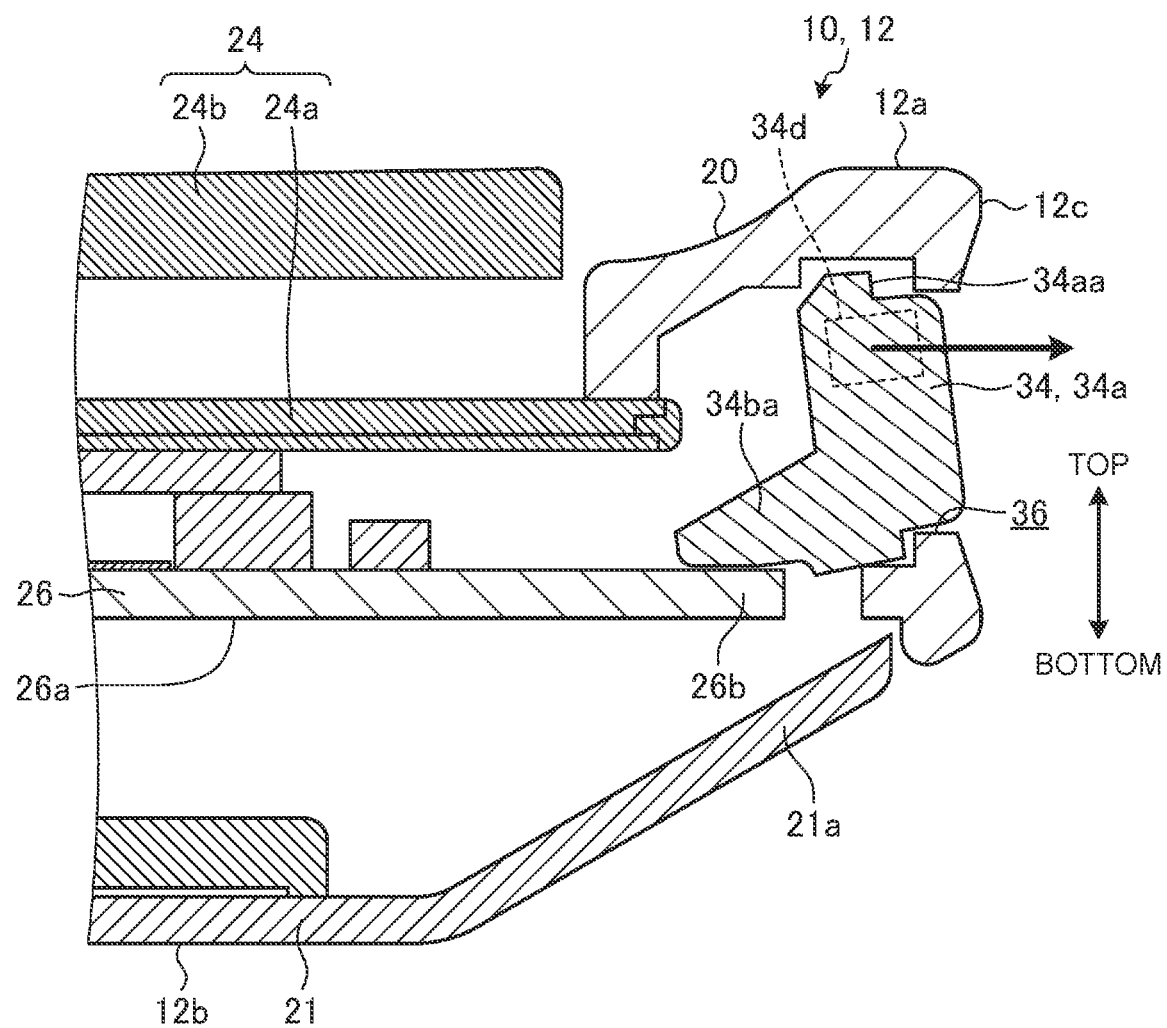
FIG. 8 is a sectional front view of a place including the restriction piece in the main body chassis when the button is pressed.

FIG. 7 is a sectional front view of a place including the restriction piece 26b in the main body chassis 12. FIG. 8 is a sectional front view of a place including the restriction piece 26b in the main body chassis 12 when the button 34 is pressed. As illustrated in FIG. 7, the fin piece 34ba protrudes in the direction (left in FIG. 7) in which the fin piece 34ba is displaced when the button 34 is pressed. Further, the restriction piece 26b is provided in such a manner as to face the fin piece 34ba at a position vertically shifted to a lower level than the fin piece 34ba. The fin piece 34ba forms an acute angle as described above, so that the fin piece 34ba has a shape in which the distance from the restriction piece 26b increases toward the tip thereof. When the button 34 is inactive, the fin piece 34ba is slightly shifted laterally from the end portion of the support plate 24a.

Therefore, when the main body chassis 12 is assembled, the keyboard 24 can be attached and detached from below in the absence of the lower cover member 21 while the button 34 remains at a predetermined position.

Meanwhile, in the electronic apparatus 10 provided with the button switch 30 configured as described above, the switch 32 and the operation section 34a of the button 34 are not coaxial, so that when the operation section 34a is pressed, a rotational moment indicated by the arrow acts about a contact point P between the arm portion 34c and the actuator 32b as illustrated in FIG. 6. However, the fin pieces 34ba are protrusively provided on the button 34, and the motherboard 26 is provided with the restriction pieces 26b located at the positions where the restriction pieces 26b face the fin pieces 34ba at a lower level than the fin pieces 34ba, so that even when the button 34 rotates, the fin pieces 34ba come in contact with the restriction pieces 26b as illustrated in FIG. 8. This means that the restriction pieces 26b act as the restriction sections that restrict the rotation of the button 34 when the arm portion 34c of the button 34 presses the actuator 32b. This restricts the button 34 from excessively rotating, resulting in high operability.

The fin pieces 34ba and the restriction pieces 26b are provided in pairs on both sides of the switch 32, thus providing good balance and a uniform rotation restricting action. The restriction pieces 26b are formed of the end portion of the motherboard 26, and can be placed at an accurate position so as to consistently restrict the rotation of the button 34. In addition, the restriction pieces 26b ideally prevent an increase of the number of components. However, as such restriction sections, other than the restriction pieces 26b, a rib, for example, may be provided on the lower cover member 21 in such a manner as to be placed at the same position as the restriction pieces 26b.

Further, the elastic pieces 34d are provided at the positions shifted upward from the center of the operation section 34a, so that the elastic pieces 34d act to laterally pull back the upper portion of the operation section 34a when the operation section 34a is pressed as illustrated by the arrow in FIG. 8. Consequently, a force that cancels the moment of rotation about the contact point P is generated in the button 34, thus making it possible to suppress the rotation of the button 34.

In addition, the fin pieces 34ba have a shape in which the distance to the restriction pieces 26b increases toward the tips thereof, so that the fin pieces 34ba come in contact with the restriction pieces 26b after the button 34 slightly rotates as illustrated in FIG. 8. In other words, the button 34 is allowed to slightly rotate. An insufficient gap between the fin pieces 34ba and the restriction pieces 26b may cause these pieces to be stuck due to friction, but the fin pieces 34ba are shaped such that the distance to the restriction pieces 26b increases toward the tips thereof as described above so as to allow the button 34 to slightly rotate, thereby making it possible to prevent the sticking.

The button switch 30 can be applied to applications other than the power in the electronic apparatus 10 (e.g., a speaker volume application). Although the description has been given of the example in which the button switch 30 is provided on the side surface of the main body chassis 12, the button switch 30 may alternatively be provided on a side surface of the display chassis 14. In this case, the keyboard 24 in the main body chassis 12 corresponds to the display 18 in the display chassis 14, and the button switch 30 can be applied to a configuration in which an electronic board and the switch 32 are placed so as to overlap the display 18.

It is needless to say that the present invention is not limited to the above-described embodiments, and can be freely modified within a range not departing from the gist of the present invention.

DESCRIPTION OF SYMBOLS 10 electronic apparatus
12 main body chassis (chassis)
12c side wall
14 display chassis
21 lower cover member
21a inclined surface
24 keyboard
24a support plate
26 motherboard (electronic board)
26a lower surface
26b restriction piece
30 button switch
32 switch
32a main body
32b actuator
34 button
34a operation section
34b protrusion piece
34ba fin piece
34c arm portion
34d elastic piece
36 button opening

The invention claimed is:

1. An electronic apparatus having a flat-shaped chassis provided with an electronic board, the electronic apparatus comprising:
    a switch provided at an end portion of the electronic board such that an actuator protrudes along a side-to-side axis of the chassis that is perpendicular to a top-to-bottom axis of the chassis;
    a button for pressing the actuator;
    a restriction section that restricts the button from rotating around a portion of contact with the actuator at a time of pressing the actuator; and
    a button opening formed in a side surface of the chassis at a position shifted, in a first direction along the top-to-bottom axis of the chassis, relative to the switch, wherein the button includes:
        an operation section partly exposed through the button opening;
        an arm that extends, in a second direction that is opposite to the first direction along the top-to-bottom axis of the chassis, to a position facing the actuator; and
        a fin that protrudes in a direction of displacement at the time of a pressing operation, and
    the restriction section faces the fin and is disposed at a position shifted, in the second direction along the top-to-bottom axis of the chassis, relative to the fin.

2. The electronic apparatus according to claim 1, wherein the restriction section is formed of an end portion of the electronic board.

3. The electronic apparatus according to claim 1, wherein the button has an elastic piece protruding from both ends of the operation section in a direction orthogonal to the fin, and
    each elastic piece is provided at a position shifted, in the first direction along the top-to-bottom axis of the chassis, relative to a center of the operation section.

4. The electronic apparatus according to claim 1, wherein a pair of the fin and the restriction section is provided on each side of the switch.

5. The electronic apparatus according to claim 1, wherein along the top-to-bottom axis of the chassis, a distance between the restriction section and the fin increases toward a tip of the fin.

6. The electronic apparatus according to claim 1, wherein viewed along the side-to-side axis of the chassis, the button opening does not overlap any portion of the switch.

7. The electronic apparatus according to claim 1, wherein viewed along the side-to-side axis of the chassis, the button opening does not overlap any portion of the actuator.

8. The electronic apparatus according to claim 1, wherein the restriction section restricts the button by directly contacting the fin at the time of the pressing operation.

9. The electronic apparatus according to claim 1, wherein a surface of the chassis is provided with a keyboard, and the button opening is provided in a side of the keyboard.

10. The electronic apparatus according to claim 9, wherein
    in a configuration where the button is inactive:
        the fin is at a position laterally shifted, along the side-to-side axis, from an end portion of the keyboard, and
        viewed along the top-to-bottom axis of the chassis, the fin does not overlap any portion of the keyboard.

11. The electronic apparatus according to claim 9, wherein
    the switch is mounted on a surface of the electronic board that faces the second direction along the top-to-bottom axis of the chassis.

* * * * *